United States Patent
Wakabayashi (10) Patent No.: US 10,437,531 B2
(45) Date of Patent: Oct. 8, 2019

(54) CONTROL METHOD OF INFORMATION PROCESSING DEVICE CONTROLLING FIRST APPLICATION PROGRAM, SECOND APPLICATION PROGRAM, AND THIRD APPLICATION PROGRAM

(71) Applicant: CANON KABUSHIKI KAISHA, Tokyo (JP)

(72) Inventor: Yuuki Wakabayashi, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/612,792

(22) Filed: Jun. 2, 2017

(65) Prior Publication Data
US 2017/0351467 A1 Dec. 7, 2017

(30) Foreign Application Priority Data
Jun. 6, 2016 (JP) .................. 2016-112728

(51) Int. Cl.
*G06F 3/12* (2006.01)
*G06F 8/61* (2018.01)
(Continued)

(52) U.S. Cl.
CPC .......... *G06F 3/1226* (2013.01); *G06F 3/1204* (2013.01); *G06F 3/1205* (2013.01); *G06F 3/1225* (2013.01); *G06F 3/1236* (2013.01); *G06F 3/1292* (2013.01); *G06F 8/61* (2013.01); *G06F 9/445* (2013.01); *G06F 9/44505* (2013.01); *G06F 9/48* (2013.01); *G06F 9/54* (2013.01); *G06F 9/543* (2013.01); *G06F 9/544* (2013.01); *H04M 1/72522* (2013.01)

(58) Field of Classification Search
CPC .................................................... G06F 3/1226
USPC ................................................... 358/1.15
See application file for complete search history.

(56) References Cited

U.S. PATENT DOCUMENTS

2003/0197883 A1   10/2003   Lay
2013/0063753 A1    3/2013   Mitsui
(Continued)

FOREIGN PATENT DOCUMENTS

EP   2863299 A1   4/2015
GB   2271208 A    4/1994
(Continued)

OTHER PUBLICATIONS

Bram Smulders ; SQLbusRT: Real time data distribution and storage; University of Twente Electrical Engineering, Mathematics and Computer Science Enschede, The Netherlands and Imtech ICT Technical Systems Amersfoort 2007, The Netherlands pp. 1-62.
(Continued)

*Primary Examiner* — Jacky X Zheng
(74) *Attorney, Agent, or Firm* — Canon U.S.A., Inc. IP Division (57) ABSTRACT

A control program includes acquiring predetermined information saved in a storage region by a first program, by a second program that is launched in accordance with a second operation as to a screen displayed by a third program having been accepted, and executing, in a case where the predetermined information has been acquired, processing based on the predetermined information by the second program.

17 Claims, 6 Drawing Sheets

(51) Int. Cl.
*G06F 9/445* (2018.01)
*G06F 9/48* (2006.01)
*G06F 9/54* (2006.01)
*H04M 1/725* (2006.01)

(56) References Cited

U.S. PATENT DOCUMENTS

| | | | | |
|---|---|---|---|---|
| 2014/0259028 | A1* | 9/2014 | Atwood | G06F 9/543 |
| | | | | 719/313 |
| 2015/0205552 | A1* | 7/2015 | Sasase | G06F 3/1255 |
| | | | | 358/1.15 |
| 2016/0286058 | A1* | 9/2016 | Nagasawa | H04N 1/00307 |
| 2016/0359945 | A1* | 12/2016 | Boudville | H04L 67/02 |

FOREIGN PATENT DOCUMENTS

| | | | |
|---|---|---|---|
| JP | 2006155289 A | 6/2006 | |
| JP | 2016-018285 A | 2/2016 | |

OTHER PUBLICATIONS

Giovanni Cortese, Massimiliano Lunghi, Fabrizio David; Context-Awareness for Physical Service Environments; Ambient Intelligence, IOS Press, 2005; pp. 71-96.

* cited by examiner

CONTROL METHOD OF INFORMATION PROCESSING DEVICE CONTROLLING FIRST APPLICATION PROGRAM, SECOND APPLICATION PROGRAM, AND THIRD APPLICATION PROGRAM

BACKGROUND OF THE INVENTION

Field of the Invention

The present invention relates to a control method.

Description of the Related Art

There are known information processing devices such as mobile terminals, smartphones, and so forth. Such information processing devices generally use a technology called program cooperation, where programs such as applications or the like installed in the information processing device operate by cooperating with each other. Specifically, program cooperation is a technology where, for example, processing based on information handled by a certain program can be executed by a different program from this certain program. Japanese Patent Laid-Open No. 2016-18285 discloses a technology where, when launching a second application (hereinafter referred to as "app") using a URL scheme from a first app, the first app and the second app can share information by adding parameters such as printing settings or the like to the URL scheme.

For example, in response to an operation being performed on a screen that a certain program (app A) displays, to launch a program that is different from app A (app B), app B launches (cooperative launch). App B can also launch in response to an operation performed on a screen that a store app displays, or an operation as to an app icon on a home screen (independent launch). The information processing device preferably executes the program cooperatively even in cases of an independent launch, if the usability of app B can be improved by app B executing processing based on information that app A handles (program cooperation). However, in the case of a method where information handled by app A is added to a URL scheme, as in Japanese Patent Laid-Open No. 2016-18285, program cooperation cannot be performed if app B independently launches.

SUMMARY OF THE INVENTION

It has been found desirable to enable a program that has launched independently to execute processing based on information handled by a program other than itself.

A control method of an information processing device includes: accepting of a first operation as to a screen displayed by a first program; saving of predetermined information in a storage region by the first program; executing, in a case where a second program that is different from the first program is installed in the information processing device, processing of launching the second program, in accordance with the first operation having been accepted, and in a case where the second program is not installed in the information processing device, processing of launching a third program for installing the second program in the information processing device, in accordance with the first operation having been accepted; acquiring the predetermined information saved in the storage region by the first program, by the second program that is launched in accordance with a second operation as to a screen displayed by the third program having been accepted; and executing, in a case where the predetermined information has been acquired, processing based on the predetermined information by the second program.

A control method of an information processing device configured to accept a first operation as to a screen displayed by a first program, save of predetermined information in a storage region by the first program, and execute, in a case where a second program that is different from the first program is installed in an information processing device, processing of launching the second program, in accordance with the first operation having been accepted, and in a case where the second program is not installed in the information processing device, processing of launching a third program for installing the second program in the information processing device, in accordance with the first operation having been accepted, the method including: acquiring the predetermined information saved in the storage region by the first program, by the second program that is launched in accordance with a second operation as to a screen displayed by the third program having been accepted; and executing, in a case where the predetermined information has been acquired, processing based on the predetermined information by the second program.

A control method of an information processing device, the method including: accepting of a first operation as to a screen displayed by a first program; saving of predetermined information in a storage region by the first program; and executing, in a case where a second program that is different from the first program is installed in the information processing device, processing of launching the second program, in accordance with the first operation having been accepted, and in a case where the second program is not installed in the information processing device, processing of launching a third program for installing the second program in the information processing device, in accordance with the first operation having been accepted. The predetermined information saved in the storage region by the first program is acquired by the second program that is launched in accordance with a second operation as to a screen displayed by the third program, having been accepted. In a case where the predetermined information has been acquired, processing based on the predetermined information is executed by the second program.

Further features of the present invention will become apparent from the following description of exemplary embodiments with reference to the attached drawings.

DESCRIPTION OF THE EMBODIMENTS

The information processing device according to the present invention will be described in detail with reference to the drawings. It should be noted that the following embodiments do not restrict the scope of the invention laid forth in the Claims. Further, not all combinations of features described in the embodiments are essential to the present invention.

First Embodiment

An information processing device to which the present invention is applied will be described. Although a mobile terminal is exemplified as the information processing device in a first embodiment, this is not restrictive. Examples of devices that can be applied as the information processing device include various types of devices to which programs can be installed, including laptop PCs, tablet terminals, personal digital assistants (PDAs), digital cameras, music player devices, television sets, and so forth. A smartphone is also exemplified as the mobile terminal in the present embodiment. A smartphone is a multifunctional cellular phone that has camera functions, Internet browsing functions, email functions, and so forth, in addition to cellular phone functions.

Figure 1A:
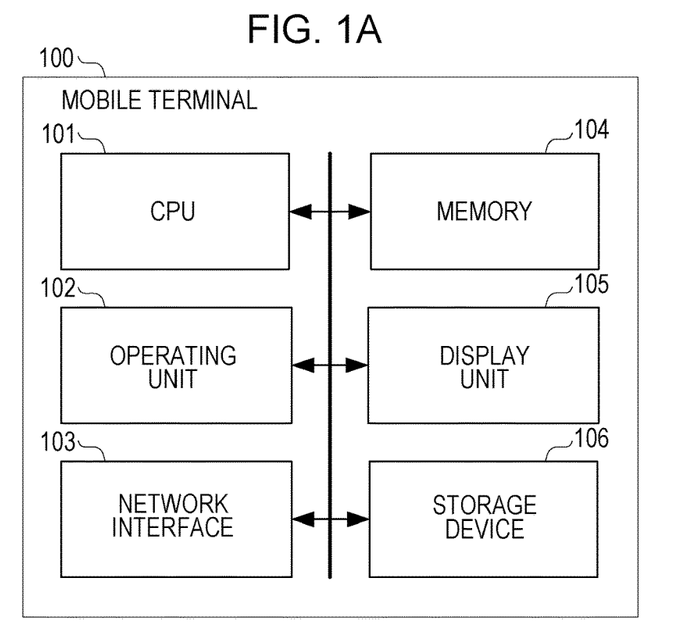
FIGS. 1A and 1B are diagrams illustrating the configuration of an information processing device according to an embodiment.
Figure 1B:
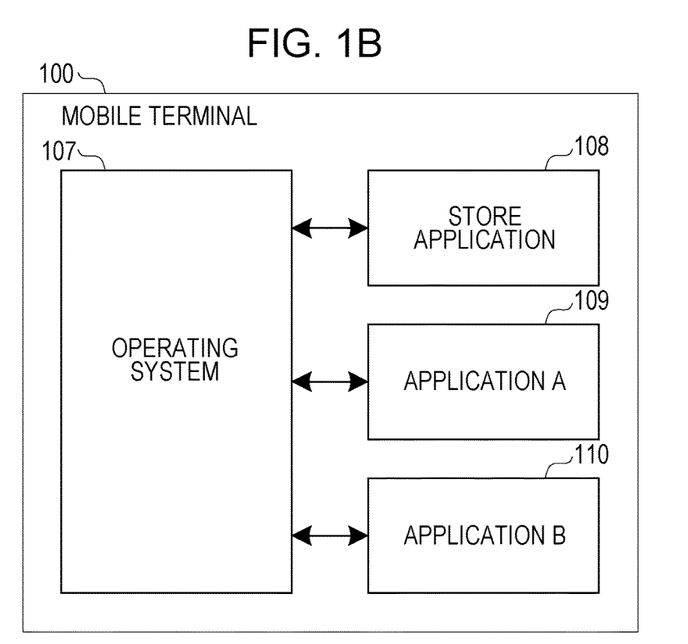

FIGS. 1A and 1B illustrate the configuration of a mobile terminal 100, serving as the information processing device according to the present embodiment. FIG. 1A illustrates the hardware configuration of the mobile terminal 100, and FIG. 1B illustrates the software configuration of the mobile terminal 100. The mobile terminal 100 has a central processing unit (c=) 101, an operating unit 102, a network interface 103, memory 104, a display unit 105, and a storage device 106, these each being connected via a system bus.

The CPU 101 controls the overall mobile terminal 100. The operating unit 102 is an operating unit by which the user issues instructions to the mobile terminal 100, and includes buttons, a touch panel, and so forth, for example. The memory 104 is random access memory (RAM) serving as a work region for the CPU 101, and is used as a temporary storage region for various types of received data and for storing various types of settings data. The storage device 106 is flash memory or the like, for example, that stores various types of control programs such as applications and an operating system (hereinafter referred to as "OS").

The network interface 103 is an interface for connecting to a network. The mobile terminal 100 can connect to networks via the network interface 103, and is configured to be capable of connecting to external devices such as printers and the like, and the Internet, via network.

The display unit 105 is a unit that displays various types of information, and is made up of a liquid crystal panel or the like. The operating unit 102 is a unit that accepts operations from the user. Note that in the present embodiment, the operating unit 102 and the display unit 105 have the same configuration, and are arranged so that user operations can be accepted and various types of information can be displayed with a single configuration. That is to say, the operating unit 102 and the display unit 105 are realized as a touchscreen. The user can give various types of instructions to the mobile terminal 100 and operate the mobile terminal 100 by tracing, tapping, and so forth, on the touchscreen, by fingers or the like. The user is not restricted to operating the touchscreen with fingers, and can give various types of instructions to the mobile terminal 100 by operating the touchscreen using a pen for an electrostatic touch panel, such as a stylus, for example. Note that the operating unit 102 and display unit 105 do not have to be of the same configuration. For example, the operating unit 102 may be a physical keyboard having physical keys, or the like.

The mobile terminal 100 according to the present embodiment has an OS 107, a store application 108, and two or more apps (application A 109 and application B 110), as illustrated in FIG. 1B. Hereinafter, applications will be referred to as "apps".

Figure 5:
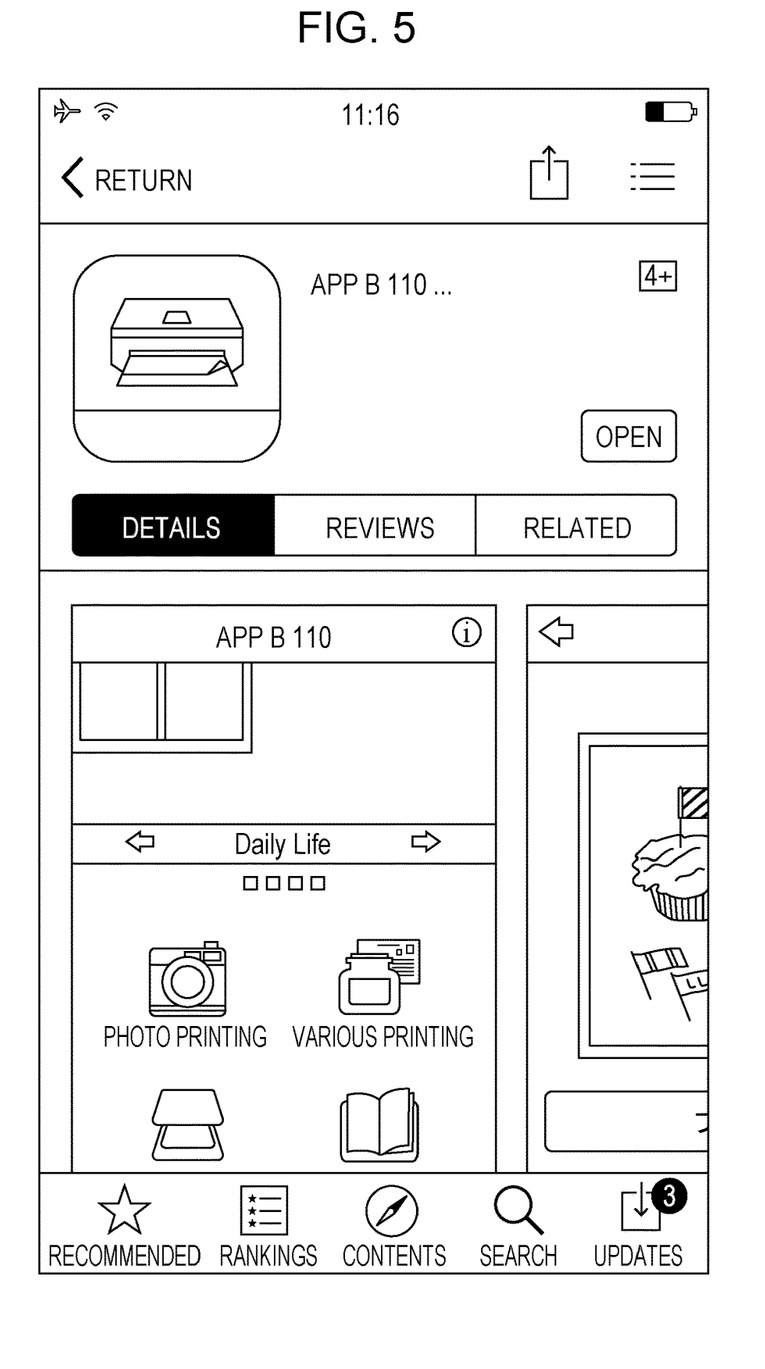
FIG. 5 is a screen displayed on the information processing device according to the embodiment by a store app.

The store application 108 is an app for downloading apps to the mobile terminal 100. The user can select desired apps in the store application 108, and download and install the selected apps to the mobile terminal 100 by performing predetermined operations for downloading (tapping on a download button, password authentication, etc.). The user also can launch apps installed to the mobile terminal 100, via the store application 108, by performing a predetermined operation on a screen displayed by the store application 108 (tapping on an "open" button, etc.). FIG. 5 is a diagram illustrating an example of a screen displayed by the store application 108. FIG. 5 is a screen for launching app B in a state where app B is already installed in the mobile terminal 100. Tapping on the "open" button launches app B, as described above.

The app A 109 and the app B 110 are apps installed to the mobile terminal 100 by the store application 108, via network or the like. Note that the app A 109 and the app B 110 are not restricted to being installed via the store application 108, and may be installed from a storage medium or the like storing the apps, for example. The app A 109 may be stored beforehand in the mobile terminal 100 at the time of shipping. In the present embodiment, the app A 109 and the app B 110 are apps for transmitting print jobs to a printer having printing functions, to execute printing based on the transmitted print jobs. The app A 109 and the app B 110 are not restricted to functions to cause a printer to execute printing, and may have other functions. For example, the apps may have functions for transmitting a scan job to a printer, and causing scanning to be executed based on the transmitted scan job.

The store application 108, the app A 109, and the app B 110 operate via the OS 107. This software is all stored in the storage device 106, and is loaded to the memory 104 and executed by the CPU 101.

Figure 2A:
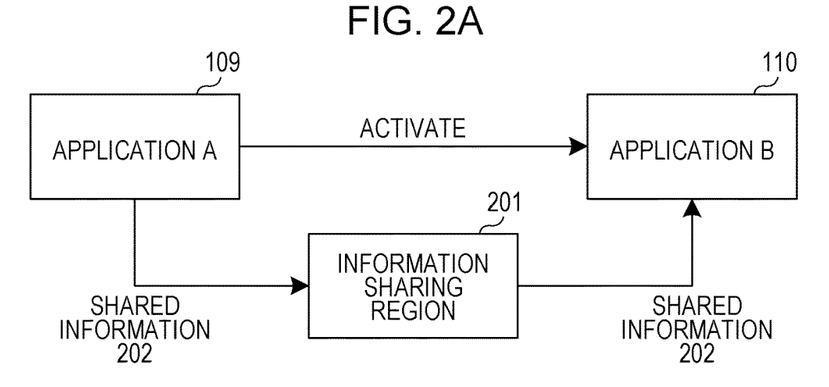
FIGS. 2A through 2C are diagrams illustrating variations in app cooperation according to the embodiment.
Figure 2B:
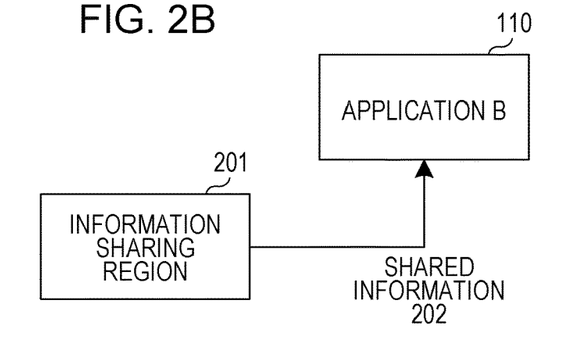
Figure 2C:
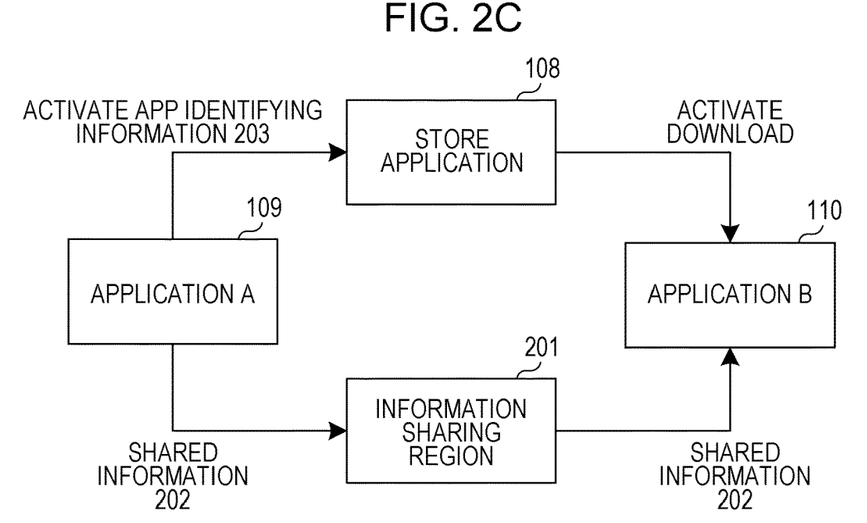

The app A 109 and the app B 110 in the present embodiment operate cooperatively. Specifically, the app B 110 operates using information used by the app A 109. Hereinafter, the programs operating cooperatively will be referred to as program cooperation, and in particular, the application programs operating cooperatively will be referred to as app cooperation. Specifically, app cooperation is a technology where processing based on information handled by the app A 109 (later-described shared information) is executable by a program different from the app A 109 (the app B 110), for example. Examples of app cooperation in several usage cases will be described below. FIG. 2A is a diagram illustrating app cooperation when the app B 110 has cooperatively launched in a state where the app A 109 and the app B 110 have already been installed in the mobile terminal 100. FIG. 2B is a diagram illustrating app cooperation when the app B 110 has independently launched in a state where the app A 109 and the app B 110 have already been installed in the mobile terminal 100. FIG. 2 is a diagram illustrating app cooperation when the app B 110 has cooperatively launched in a state where the app B 110 has not yet been installed in the mobile terminal 100. Independently launching is a case where the app B 110 has been launched by tapping on an app icon in a home screen displayed by the OS, or launched by an operation performed at a screen displayed by the store application 108, far example. Cooperative launching is the app B 110 being launched by an operation at a screen displayed by an app other than the store application 108. The app B 110 in the present embodiment is cooperatively launched by an operation at a screen displayed by the app A 109. In a case of cooperative launching, the CPU 101 can comprehend whether or not the app B 110 has cooperatively launched, since information of the app initiating the cooperative launch (the app A 109) is notified. Cooperative launching is performed, for example, in a case of causing another app to execute a function that the app A 109 cannot execute, or prompting use of another app when processing executed by the app A 109 is to be handed over to another app, and so forth.

Figure 6:
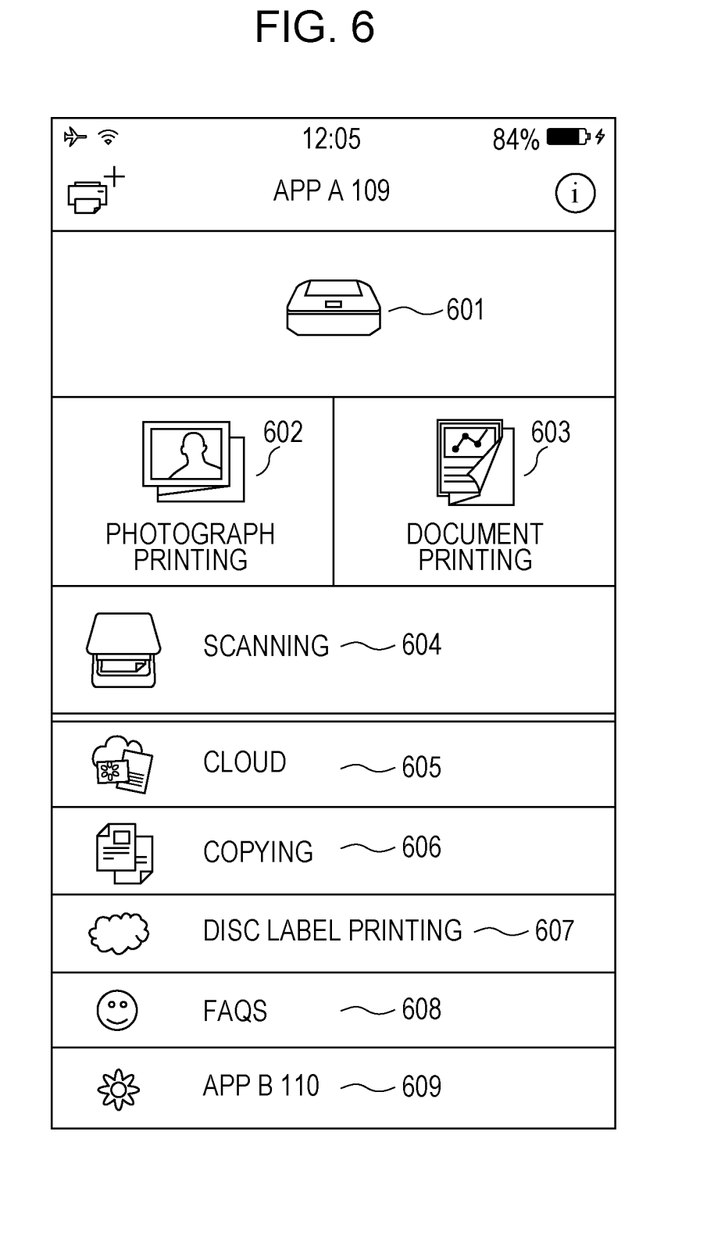
FIG. 6 is a screen displayed on the information processing device according to the embodiment by app A.

FIG. 6 is an example of a screen that the app A 109 displays. An icon 601 indicates a printer that is registered to the app A 109. Printer registration will be described later. An icon 602 and icon 603 are buttons for transmitting print jobs to the printer registered to the app A 109, to cause photographs and documents saved in the mobile terminal 100 to be printed. An icon 604 is a button for transmitting scan jobs to the printer registered to the app A 109, to cause scans to be executed. An icon 605 is a button for executing cloud print functions, where image data stored in an external server s printed by a printer. An icon 606 is a button for transmitting copy jobs to the printer registered to the app A 109, to cause copies of an original document to be created. An icon 607 is a button for transmitting print jobs to the printer, to execute printing with regard to a disc media. In a case of executing printing with regard to a disc media, for example, there are cases where another app (a disc media printing app) other than the app A 109 is necessary. In such a case, when accepting an operation of the icon 607 in a state where a disc media printing app is installed in the mobile terminal 100, the CPU 101 cooperatively launches the disc media printing app. An icon 608 is a button for starting up a Web page indicating how to operate the app A 109 or the like. An icon 609 is a button for cooperative launching of the app B 110. In a case of having accepted operation of the icon 609 in a state where the app B 110 is installed in the mobile terminal 100, the CPU 101 cooperatively launches the app B 110. In a case where a printer not compatible with the app B 110 is registered to the app A 109, the CPU 101 may gray out or hide the icon 609 from view, so that operations to the icon 609 are not accepted, for example.

A usage case where the app B 110 is cooperatively launched via the app A 109, in a state where the app A 109 and app B 110 are already installed in the mobile terminal 100, will be described with reference to FIG. 2A. First, upon determining that the app B 110 is to be cooperatively launched by accepting an operation as to the icon 609 for example, the CPU 101 saves shared information 202 in an information sharing region 201. The shared information 202 is information that the CPU 101 can use for the operations of either of the app A 109 and app B 110. The information sharing region 201 is a storage region where the shared information 202 is stored. The information sharing region 201 may be a shared folder that is accessible when either of the app A 109 and app B 110 is running, or may be something like a clipboard or pasteboard that the OS manages. Also, a shared folder may be a region included in memory within the storage device 106 or the like, may be a region included in an external storage medium such as a Secure Digital (SD) card or a hard disk drive (HDD), or may be a region on a network server, for example. The arrangement thereof is not restricted, as long as information can be stored therein that is usable when either of the app A 109 and app B 110 is running. Note that the timing at which the shared information 202 is deleted from the information sharing region 201 may be, for example, the timing at which the shared information 202 is used, or may be the timing at which launching of the cooperatively-launched app B 110 has ended. Once the app B 110 is cooperatively launched, the CPU 101 references the information sharing region 201 and acquires the shared information 202 by the app B 110, and executes processing based on the shared information 202.

In the present embodiment as described above, the app A 109 and app B 110 have print functions to cause a printer with which the mobile terminal 100 is communicable to print images. The app A 109 and app B 110 search for printers in the periphery of the mobile terminal 100 and register a printer by which printing can be executed, whereby the printing functions can be executed. Note that the processing of registering an image forming apparatus to an app is, in other words, processing of setting a device with which communication is made by this app (setting processing). In this arrangement, information relating to a printer registered at the app A 109 (hereinafter referred to as "registration information") can be applied as the shared information 202, for example. Registration information specifically is a media access control (MAC) address, Bonjour name, IP address, or the like, for example. The CPU 101 executes processing of registering a printer registered at the app A 109 to the app B 110, by the app B 110, as processing based on the shared information 202 at the time of cooperative launch of the app B 110. According to this arrangement, the CPU 101 can register the printer to the app B 110 without having the app B 110 to perform processing to search for the printer, for example. In a case where all of the information necessary to register the printer does not fit within the information sharing region 201, at least part of the information necessary for registering the printer may be applied as the shared information 202. According to this arrangement, the effects of suppressing time taken for processing to search for a printer, for example, can still be realized, and so forth, for example.

Next, the behavior of the CPU 101 in a case of independently launching the app B 110 without going through the app A 109, in a state where the app A 109 and app B 110 have already been installed in the mobile terminal 100, will be described with reference to FIG. 2B. Upon determining that the app B 110 is to be cooperatively launched by accepting an operation as to the icon 609 or the like for example, the CPU 101 saves shared information 202 in an information sharing region 201, in the same way as in FIG. 2A. In the present embodiment, the CPU 101 references the information sharing region 201 in a case of the app B 110 having been launched independently as well. In a case where shared information 202 has been saved in the information sharing region 201, the CPU 101 acquires the shared information 202, and executes processing based on the shared information 202. Thus, according to the present embodiment, the CPU 101 references the information sharing region 201 at the time of launching the app B 110, regardless of whether the app B 110 has been launched independently or cooperatively. This arrangement, enables app cooperation with the app A 109 to be executed regardless of whether the app B 110 is launched independently or cooperatively.

Next, the behavior of the CPU 101 in a case where an operation for cooperative launching the app B 110 has been performed at a screen displayed by the app A 109, in a state where the app B 110 has not yet been installed in the mobile terminal 100, will be described with reference to FIG. 2C. Even if an operation to cooperatively launch the app B 110 is made at a screen that the app A 109 displays, the CPU 101 cannot launch the app B 110 if the app B 110 has not been installed to the mobile terminal 100, as a matter of course. Generally, the store application 108 needs to be used to install the app B 110 to the mobile terminal 100. Accordingly, in a case where an operation for cooperative launching of the app B 110 has been performed at a screen displayed by the app A 109, in a state where the app B 110 has not yet been installed in the mobile terminal 100, the following processing is executed.

First, before launching the store application 108, the CPU 101 uses the app A 109 to store shared information 202 in the information sharing region 201. The CPU 101 then launches the store application 108. Note that the CPU 101 can display a screen for downloading an app that is the object of downloading (hereinafter referred to as "object app") on the display unit 105, by launching the store application 108 using information by which the object app can be identified (hereinafter referred to as "app identifying information 203"). Accordingly, the CPU 101 launches the store application 108 at this time using app identifying information 203 of which the app B 110 is the object. Thus, a screen for downloading the app B 110 is displayed on the display unit 105, so the CPU 101 accepts an operation from the user and downloads the app B 110. At this time, the CPU 101 may automatically download the app B 110 without having accepted an operation from the user. Thereafter, the CPU 101 accepts an operation at an app icon corresponding to the app B 110 at the home screen, or an operation as to a screen displayed by the store application 108 (operation for the open button in FIG. 5). The CPU 101 then launches the app B 110 in accordance to such upper operations, and executes processing the same as that illustrated in FIG. 2B. That is to say, the CPU 101 executes processing in a case of having independently launched the app B 110.

Thus, in a case where an operation for cooperative launching the app B 110 has been performed at a screen displayed by the app A 109, in a state where the app B 110 has not yet been installed in the mobile terminal 100, the CPU 101 downloads the app B 110 using the store application 108. Note that in a case where the user has intent to cooperatively launch the app B 110, the CPU 101 preferably uses the shared information 202 so that the app A 109 and app B 110 are cooperative. The information sharing region 201 is referenced as illustrated in rig. 2B in the present embodiment even in cases of independent launching, so even in a case where the app B 110 has been independently launched regardless of an operation for cooperative launching of the app B 110, the app A 109 and app B 110 can be made to be cooperative.

Although an example has been illustrated in the above description where the information sharing region 201 is always referenced regardless of whether the app B 110 is launched cooperatively or independently, this arrangement is not restrictive. For example, the app A 109 and app B 110 may separately register printers in the present embodiment. Accordingly, there are cases where the user has intentionally registered separate printers for the app A 109 and the app B 110. If a printer registered to the app A 109 is registered to the app B 110 through cooperation of the app A 109 and app B 110 in such a case, the app B 110 may be overwritten and registered by a printer that the user does not intend.

Accordingly, when launching the app B 110, the CPU 101 may determine whether or not a printer has been registered to the app B 110, and control whether or not to perform app cooperation with the app A 109 depending on the results of the determination. Specifically, in a case where a printer has not been registered at the app B 110, the CPU 101 may determine to use the shared information 202, and register the printer, registered to the app A 109, to the app B 110. The reason is that if there is no printer registered to the app B 110, the problem of a printer registered to the app B 110 being overwritten with a printer that the user does not intend will not occur. On the other hand, in a case where a printer has been registered at the app B 110, the CPU 101 determines not to use the shared information 202, and does not perform processing to register the printer, registered to the app A 109, to the app B 110. That is to say, the registered printer of the app B 110 is not changed. The reason is that the problem of the printer registered to the app B 110 being overwritten with a printer that the user does not intend may occur. Particularly, in a case where the app B 110 is independently launched, and also a printer is registered to the app B 110 there is a high likelihood that the app B 110 has been launched independently regardless of there having been a cooperative launch operation for the app B 110. That is to say, there is a high likelihood that the user has no intent for cooperation of the app A 109 and app B 110. Accordingly, cases where a printer registered to the app B 110 is changed against the intent of the user can be suppressed.

This arrangement is not restricted either, and an arrangement may be made where, for example, in a case that a printer is registered at the app B 110, the shared information 202 is used to temporarily overwrite the printer registered to the app B 110. In this case, the CPU 101 first saves information of the printer already registered to the app B 110, in memory that the mobile terminal 100 has. Thereafter, the CPU 101 overwrites the information of the already-registered printer, and registers the printer, registered to the app A 109, to the app B 110. Once transmission of a job to the registered printer has ended, or in a case where launching of the app B 110 ends once and then the app B 110 is relaunched thereafter, or the like, the printer registered before the overwriting is re-registered to the app B 110.

Particularly, in cases where the app h 110 has been cooperatively launched, there is a high likelihood that the user intends for the app A 109 and app B 110 to cooperate. Accordingly, app cooperation can be executed by performing such processing, without completely overwriting the printer information registered to the app B 110.

Figure 3:
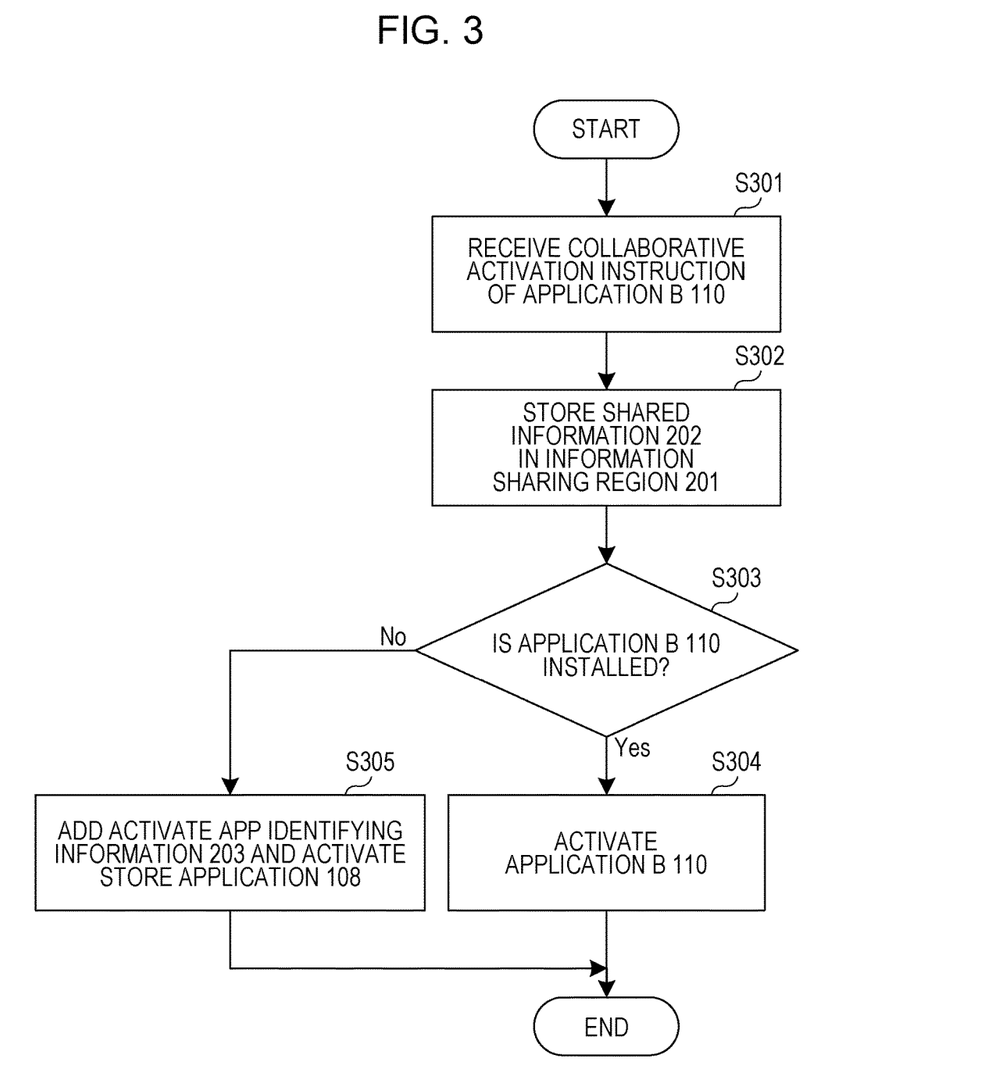
FIG. 3 is a flowchart illustrating processing that the information processing device according to the embodiment executes in a case of having received a cooperative launch operation of app B when app A is running.

FIG. 3 is a flowchart illustrating processing that the mobile terminal 100 executes in a case of having accepted a cooperative launch operation for the app B 110 when launching the app A 109. The processing illustrated by this flowchart is realized by a program corresponding to the app A 109 stored in the storage device 106 or the like being read out by the CPU 101 to the memory 104 and executed, for example. Processing of this flowchart starts in a state where a screen for executing the functions of the app A 109 is displayed on the display unit 105 by the app A 109.

First, in S301, the CPU 101 accepts a cooperative launch operation for the app B 110. A specific example is an operation of the icon 609 being accepted.

In S302, the CPU 101 stores the shared information 202 in the information sharing region 201 within the storage device 106 or memory 104. The shared information 202 here is registration information for registering the printer registered to the app A 109.

In 5303, the CPU 101 determines whether or not the app B 110 has been installed in the mobile terminal 100. In a case where determination is made that the app B 110 is installed to the mobile terminal 100, in S304 the CPU 101 launches the app B 110. Thereafter, the CPU 101 executes the processing illustrated in the later-described FIG. 4 by the app B 110. On the other hand, in a case where determination is made that the app B 110 is not installed to the mobile terminal 100, in S305 the CPU 101 launches the store application 108 by a known method using a URL scheme, for example. At this time, the store application 108 is launched by adding app identifying information 203, for the store application 108 to identify the app B 110 by, to the URL scheme. Accordingly, when the store application 108 launches, a screen for downloading the app B 110 is displayed. A user operation for downloading the app B 110 is accepted in this state, whereby the CPU 101 can download and launch the app B 110. Thereafter, the CPU 101 executes processing illustrated in FIG. 4, described below, by the app B 110.

Figure 4:
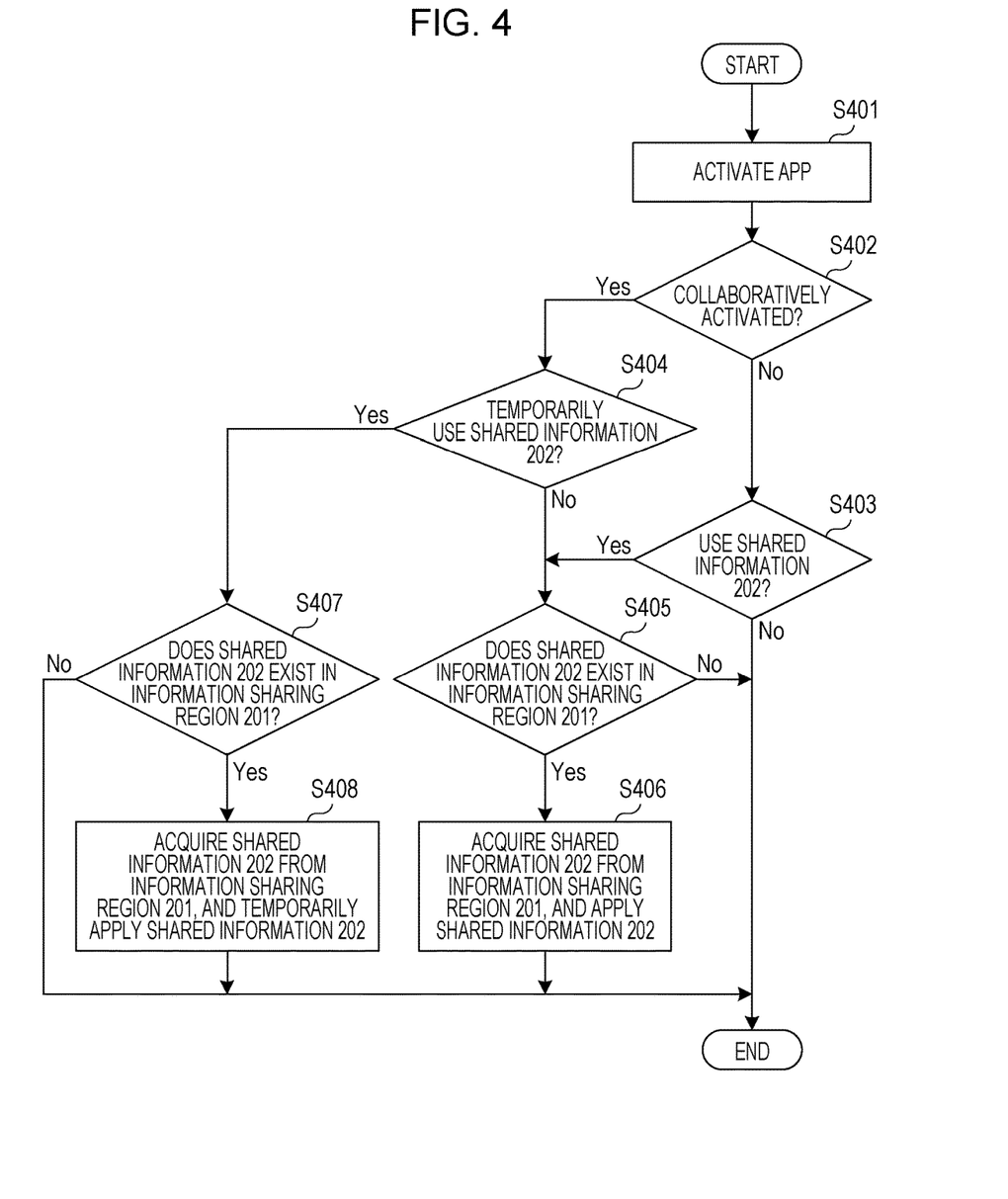
FIG. 4 is a flowchart illustrating the flow of processing that the information processing device according to the embodiment executes when app B is activated.

FIG. 4 is a flowchart illustrating the flow of processing that the mobile terminal 100 executes in a case of having launched the app B 110. The processing illustrated by this flowchart is realized by a program corresponding to the app B 110 stored in the storage device 106 being read out by the CPU 101 to the memory 104 and executed, for example.

First, S401, the CPU 101 activates the app B 110. Note that execution of the processing in S401 is triggered by accepting a cooperative launch operation for the app B 110 via the app A 109, accepting a launch instruction for the app B 110 via the store application 108, accepting a launch instruction for the app B 110 via the home screen, or the like, for example.

In S402, the CPU 101 determines whether or not the app B 110 that is running on the mobile terminal 100 has been cooperatively launched. Specifically, the CPU 101 determines whether or not the app B 110 has been launched by an operation as to a screen displayed by the app A 109. In a case of having determined that the app B 110 has been launched by an operation as to a screen displayed by the app A 109, determination is made that the app B 110 has been cooperatively launched, and the flow advances to S404. On the other hand, in a case where the app B 110 has not been launched by an operation as to a screen displayed by the app A 109, determination is made that the app B 110 has not been cooperatively launched (i.e., independently launched), and the flow advances to S403.

In S403, the CPU 101 determines whether or not to use the shared information 202. Specifically, the CPU 101 determines whether or not that a printer is registered to the app B 110 (whether or not a device that communicates is set by the app B 110), as described above. In a case where a printer is not registered to the app B 110, the CPU 101 determines that the shared information 202 is to be used, and the flow advances to S405. On the other hand, in a case where a printer is registered to the app B 110, the CPU 101 determines that the shared information 202 is not to be used, and the processing is ended without executing processing to register the printer, registered to the app A 109, to the app B 110. That is to say, the printer already registered to the app B 110 is not changed.

In S404, the CPU 101 determines whether or not to temporarily use the shared information 202. Specifically, the CPU 101 determines whether or not a printer is already registered to the app B 110, in the same way as in S403. In a case where a printer is not registered to the app B 110, the CPU 101 determines that the shared information 202 is not to be used, and the flow advances to S405. On the other hand, in a case where a printer is already registered to the app B 110, the CPU 101 determines that the shared information 202 is to be temporarily used, and the flow advances to S407.

In S405, the CPU 101 determines whether or not shared information 202 is present in the information sharing region 201. In a case where there is shared information 202 present in the information sharing region 201, the CPU 101 advances to S406, acquires the shared information 202 from the information sharing region 201, and registers the printer, registered to the app A 109, to the app B 110 based on the shared information 202. On the other hand, in a case where there is no shared information 202 present in the information sharing region 201, the CPU 101 ends the processing without executing pressing of registering the printer registered to the app A 109, to the app B 110.

The processing of S405 enables the CPU 101 to accurately confirm whether or not shared information 202 is saved in the information sharing region 201. Note that a state where shared information 202 is not saved in the information sharing region 201 is a state where, for example, the information sharing region 201 is an external server or the like, and the mobile terminal 100 cannot access the external server due to a communication error, authentication error, or the like.

Also, determination can be made by S405 regarding whether the app B 110 has independently launched in the usage case illustrated in FIG. 2C, or independently launched in the usage case illustrated in FIG. 2B. That is to say, the CPU 101 can make determination regarding whether or not the app B 110 has launched independently regardless of there having been a cooperative launch operation. This is due to shared information 202 being stored in the information sharing region 201 in a case where there is a cooperative launch operation as to the app B 110, as described earlier in the description of the usage case illustrated in FIG. 2C. Accordingly, whether or not to execute app sharing can be switched in accordance with whether or not the app B 110 has launched independently regardless of there having been a cooperative launch operation.

In S407, the CPU 101 determines whether or not there is shared information 202 present in the information sharing region 201, in the same way as in S405. In a case where there is shared information 202 present in the information sharing region 201, the CPU 101 advances to S408. In the other hand, in a case where there is no shared information 202 present in the information sharing region 201, the CPU 101 ends the processing without executing processing of registering the printer registered to the app A 109, to the app B 110.

In S408, the shared information 202 is acquired from the information sharing region 201, and the printer registered to the app A 109 is temporarily registered to the app B 110 based on the shared information 202. Specifically, as described above with reference to FIG. 2C, the CPU 101 first saves information of the printer already registered to the app B 110 in memory that the mobile terminal 100 has. The CPU 101 thereafter overwrites information of the registered printer, and registers the printer registered to the app A 109, to the app B 110. The printer that had been registered before the overwriting is re-registered to the app B 110 in a case where transmission of a job to the registered printer has ended, or launching of the app B 110 is ended and thereafter the app B 110 is launched again, or the like.

Thus, in a case where a cooperative launch operation of the app B 110 is received via the app A 109 in a static where the app B 110 is not installed, the CPU 101 executes downloading and launching of the app B 110 via the store application 108 in the present embodiment. The app B 110 is launched from the store application 108 at this time, so launching of the app B 110 is determined by the CPU 101 to be independent launching even though a cooperative launch operation of the app B 110 has been performed. The information sharing region 201 is referenced by the CPU 101 when performing an independent launch as well in the present embodiment, so the shared information 202 can be used even in a case of independent launching of the app B 110 even though a cooperative launch operation of the app B 110 has been performed.

There also are cases where the app B 110 is independently launched without a cooperative launch operation of the app B 110 having been performed. That is to say, there are cases where the app B 110 is launched by an operation as to an app icon at the home screen, or by an operation as to a screen displayed by the store application 108 that has launched without being guided by the app A 109. In such cases, for example, the user may not intend for the app A 109 and app B 110 to cooperate. That is to say, there are cases where the user intentionally sets separate printers for the app A 109 and the app B 110, for example. Accordingly, in a case where the app B 110 has been independently launched, the CPU 101 determines whether or not a printer has been registered to the app B 110, and switches whether or not to use the shared information 202 in accordance with the determination results. Thus, a case can be prevented in the present embodiment where the shared information 202 is unexpectedly used in a case of the app B 110 launching independently without accepting a cooperative launch operation of the app B 110, confusing the user.

Other Embodiments

Although description has been made in the above-described embodiment regarding an arrangement where the store application 108 executes downloading of the app B 110, this is not restrictive. For example, the CPU 101 may download the app B 110 from a Web page. In this case, processing of launching the store application 108 is processing of launching a program to display the Web page. The Web page for downloading the object app can be directly displayed in the case of launching the program for displaying the Web image as well, by using information relating to the object app. Also, the CPU 101 may install the app B 110 using an installer, after having downloaded the app B 110 by the store application 108. The CPU 101 may also perform downloading and installation of the app B 110 from a personal computer.

An arrangement has been described in the above embodiment where the information sharing region 201 is referenced and the shared information 202 is acquired in a case where the app B 110 has launched independently as well as launched cooperatively. However, this arrangement is not restrictive, and app cooperation may be performed using information added to a URL scheme as the shared information 202 in a case where the app B 110 has cooperatively launched, for example. Accordingly, the CPU 101 stores information in the information sharing region 201 and adds information to the URL scheme in a case where there has been a cooperative launch operation as to the app B 110.

Also, although an example has been described in the above embodiment where the app A 109 and app B 110 are print apps and the shared information 202 is registration information, this arrangement is not restrictive. That is to say, it is sufficient for the app A 109 and app B 110 to be apps capable of sharing information with each other, and the functions thereof are not restricted. The content of the shared information 202 is not restricted either. For example, the app A 109 may be a camera app and the app B 110 may be a photo album creating app. In this case, the shared information 202 may be image data or the like that can be laid out in a photo album. In this case, specific processing in app cooperation may be processing of forming thumbnails of the shared information 202 (image data) and displaying, storing the shared information 202 in a region that can be referenced by the app B 110, and so forth. The devices registered to the app A 109 and app B 110 are not restricted to image forming apparatuses, and may be any devices that communicate by the app A 109 and app B 110.

Although shared information 202 is not acquired in the above-described embodiment in a case where processing of S408 or S406 is not executed, this is not restrictive. For example, an arrangement may be made where the shared information 202 is always acquired in a case where the app B 110 is launched, and determination is executed in the determinations in S402 through S405 and S407 regarding whether or not to perform execution based on the shared information 202.

Although the shared information 202 is saved in the information sharing region 201 in a case where an operation for cooperative launch of the app B 110 is performed as to a screen displayed by the app A 109 in the above-described embodiment, this arrangement is not restrictive. For example, the shared information 202 may be saved in the information sharing region 201 at the timing of the shared information 202 being received or generated by the CPU 101.

The above-described embodiment may be realized by executing processing where software (program) realizing the functions of the above-described embodiment is supplied to a system or device via a network or various types of storage media, and a computer (CPU, microprocessor unit (MPU), etc.) of the system or computer reads out and executes the program. The program may be executed at one computer, or may be cooperatively executed on multiple computers. Not all of the above-described processing needs to be executed by software, and an arrangement may be made where part or all of the processing is executed by hardware such as an application specific integrated circuit (ASIC) or the like. The arrangement where a single CPU performs all processing is not restrictive either, and multiple CPUs may perform processing, cooperating as appropriate.

According to the present invention, in a case where a program, has independently launched, processing based on information used by a program other than this program can be executed.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-112728, filed Jun. 6, 2016, which is hereby incorporated by reference herein in its entirety.

What is claimed is:

1. A control method of an information processing device capable of controlling a first application program for communicating with another device different from the information processing device, a second application program for communicating with the other device, and a third application program for installing the second application program in the information processing device, wherein the second application program is launchable in the information processing device in a state where the second application program is already installed in the information processing device, in a case where a first user operation is performed on a screen displayed by the first application program and in a case where a second user operation is performed on a screen displayed by the third application program, the method comprising:

saving predetermined information about a device set in the first application program as a communicating device with which the information processing device communicates by the first application program in a storage region by the first application program;

executing, in accordance with the first user operation having been accepted in a state where the second application program is already installed in the information processing device, processing of launching the second application program, and in accordance with the first user operation having been accepted in a state where the second application program is not yet installed in the information processing device, processing of launching the third application program for installing the second application program in the information processing device;

acquiring, after the second application program is launched in accordance with the second user operation to the screen displayed by the third application program, the predetermined information saved in the storage region by the first application program by the second application program being launched in accordance with the second user operation; and executing, by the second application program based on the acquired predetermined information, in a case where the second application program is launched in accordance with the second user operation having been accepted after the second application program is installed in the information processing device by the third application program, setting processing of setting the communicating device set in the first application program as the communicating device with which the information processing device communicates by the first application program in the second application program as a communicating device with which the information processing device communicates by the second application program, wherein first determination processing is executed for determining whether the second application program is already installed in the information processing device in a case where the first user operation has been accepted, wherein processing for launching the second application program is executed in a case where the first determination processing determines that the second application program is already installed in the information processing device and where the first user operation has been accepted, wherein processing for launching the third application program is executed in a case where the first determination processing determines that the second application program is not yet installed in the information processing device and where the first user operation has been accepted, wherein second determination processing is executed for determining whether the communicating device with which the information processing device communicates by the second application program is already set in the second application program in a case where the second application program is launched in accordance with the second user operation having been accepted, wherein the setting processing is executed in a case where the second determination processing determines that the communicating device with which the information processing device communicates by the second application program is not yet set in the second application program, and wherein a program for executing the first determination processing and a program for executing the second determination processing are installed at different timings.

2. The control method according to claim 1, wherein the predetermined information saved by the first application program is also acquired by the second application program launched in accordance with the first user operation having been accepted.

3. The control method according to claim 1, wherein the predetermined information is saved in the storage region by the first application program, in accordance with the first user operation having been accepted.

4. The control method according to claim 1, wherein in a case where a communicating device with which the information processing device communicates is not yet set in the second application program by the second application program, the setting processing is executed, and in a case where a communicating device with which the information processing device communicates has already been set in the second application program by the second application program, the setting processing is not executed.

5. The control method according to claim 1, wherein in a case where a communicating device with which the information processing device communicates is not yet set in the second application program by the second application program, the setting processing is executed, and in a case where a communicating device with which the information processing device communicates has already been set in the second application program by the second application program, processing is executed to temporarily set the device based on the predetermined information in the second application program as the communicating device by the second application program, until a job is transmitted by the first application program, or until launching of the first application program ends.

6. The control method according to claim 1,
wherein, in a case where the second application program is launched by an app icon being tapped in a home screen displayed by an operating system of the information processing device, processing based on the predetermined information is not executed.

7. The control method according to claim 1,
wherein at least one of the first application program and the second application program is an application that causes an image forming apparatus to execute printing.

8. A control method of an information processing device capable of controlling a first application program for communicating with another device different from the information processing device, a second application program for communicating with the other device, and a third application program for installing the second application program in the information processing device, wherein the second application program is launchable in the information processing device in a state where the second application program is already installed in the information processing device, in a case where a first user operation is performed on a screen displayed by the first application program and in a case where a second user operation is performed on a screen displayed by the third application program,
save predetermined information about a device set in the first application program as a communicating device with which the information processing device communicates by the first application program in a storage region by the first application program,
and execute,
in a case where the second application program that is different from the first application program is installed in the information processing device, processing of launching the second application program, in accordance with the first user operation having been accepted, and
in a case where the second application program is not installed in the information processing device, processing of launching the third application program, in accordance with the first user operation having been accepted,
the method comprising:
acquiring, by the second application program, after the second application program is launched, the predetermined information saved in the storage region; and
executing, by the second application program based on the acquired predetermined information, in a case where the second application program is launched in accordance with the second user operation having been accepted after the second application program is installed in the information processing device by the third application program, setting processing of setting the communicating device set in the first application program as the communicating device with which the information processing device communicates by the first application program in the second application program as a communicating device with which the information processing device communicates by the second application program,
wherein first determination processing is executed for determining whether the second application program is already installed in the information processing device in a case where the first user operation has been accepted,
wherein processing for launching the second application program is executed in a case where the first determination processing determines that the second application program is already installed in the information processing device and where the first user operation has been accepted,
wherein processing for launching the third application program is executed in a case where the first determination processing determines that the second application program is not yet installed in the information processing device and where the first user operation has been accepted,
wherein second determination processing is executed for determining whether the communicating device with which the information processing device communicates by the second application program is already set in the second application program in a case where the second application program is launched in accordance with the second user operation having been accepted,
wherein the setting processing is executed in a case where the second determination processing determines that the communicating device with which the information processing device communicates by the second application program is not yet set in the second application program, and
wherein a program for executing the first determination processing and a program for executing the second determination processing are installed at different timings.

9. The control method according to claim 8,
wherein the predetermined information saved by the first application program is also acquired by the second application program launched in accordance with the first user operation having been accepted.

10. The control method according to claim 8,
wherein, in a case where a communicating device with which the information processing device communicates is not yet set in the second application program by the second application program, the setting processing is executed, and in a case where a communicating device with which the information processing device communicates has already been set in the second application program by the second application program, the setting processing is not executed.

11. The control method according to claim 8,
wherein, in a case where a communicating device with which the information processing device communicates is not yet set in the second application program by the second application program, the setting processing is executed, and in a case where a communicating device with which the information processing device communicates has already been set in the second application program by the second application program, processing is executed to temporarily set the device based on the predetermined information in the second application program as the communicating device by the second application program, until a job is transmitted by the first application program, or until launching of the first application program ends.

12. The control method according to claim 8,
wherein, in a case where the second application program is launched by an app icon being tapped in a home screen displayed by an operating system of the information processing device, processing based on the predetermined information is not executed.

13. The control method according to claim 8,
wherein at least one of the first application program and the second application program is an application that causes an image forming apparatus to execute printing.

14. A control method of an information processing device capable of controlling a first application program for communicating with another device different from the information processing device, a second application program for communicating with the other device, and a third application program for installing the second application program in the information processing device, wherein the second application program is launchable in the information processing device in a state where the second application program is already installed in the information processing device, in a case where a first user operation is performed on a screen displayed by the first application program and in a case where a second user operation is performed on a screen displayed by the third application program, the method comprising:
saving predetermined information about a device set in the first application program as a communicating device with which the information processing device communicates by the first application program in a storage region by the first application program; and
executing,
in accordance with the first operation having been accepted in a state where the second application program is already installed in the information processing device, processing of launching the second application program, and
in accordance with the first user operation having been accepted in a state where the second application program is not yet installed in the information processing device, processing of launching the third application program,
wherein, in a case where the second application program is launched in accordance with the second user operation having been accepted after the second application program is installed in the information processing device by the third application program, setting processing of setting the communicating device set in the first application program as the communicating device with which the information processing device communicates by the first application program in the second application program as a communicating device with which the information processing device communicates by the second application program is executed by the second application program based on the acquired predetermined information
wherein first determination processing is executed for determining whether the second application program is already installed in the information processing device in a case where the first user operation has been accepted,
wherein processing for launching the second application program is executed in a case where the first determination processing determines that the second application program is already installed in the information processing device and where the first user operation has been accepted,
wherein processing for launching the third application program is executed in a case where the first determination processing determines that the second application program is not yet installed in the information processing device and where the first user operation has been accepted,
wherein second determination processing is executed for determining whether the communicating device with which the information processing device communicates by the second application program is already set in the second application program in a case where the second application program is launched in accordance with the second user operation having been accepted,
wherein the setting processing is executed in a case where the second determination processing determines that the communicating device with which the information processing device communicates by the second application program is not yet set in the second application program, and
wherein a program for executing the first determination processing and a program for executing the second determination processing are installed at different timings.

15. The control method according to claim 14,
wherein the predetermined information saved by the first application program is also acquired by the second application program launched in accordance with the first user operation having been accepted.

16. The control method according to claim 14,
wherein, in a case where a device corresponding to the second application program has been set as a communicating device by the first application program, the first user operation is accepted,
and wherein, in a case where a device corresponding to the second application program has not been set as a communicating device by the first application program, the first user operation is not accepted.

17. The control method according to claim 14,
wherein at least one of the first application program and the second application program is an application that causes an image forming apparatus to execute printing.

* * * * *